(12) United States Patent
Saito et al.

(10) Patent No.: US 7,121,154 B2
(45) Date of Patent: Oct. 17, 2006

(54) LOAD SENSOR HAVING HOURGLASS-SHAPED COIL SPRING

(75) Inventors: Kiyoshi Saito, Osaka (JP); Noriyuki Jitosho, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 288 days.

(21) Appl. No.: 10/487,563

(22) PCT Filed: Jun. 2, 2003

(86) PCT No.: PCT/JP03/06916

§ 371 (c)(1),
(2), (4) Date: Feb. 24, 2004

(87) PCT Pub. No.: WO03/102526

PCT Pub. Date: Dec. 11, 2003

(65) Prior Publication Data

US 2004/0238235 A1  Dec. 2, 2004

(30) Foreign Application Priority Data

Jun. 3, 2002  (JP) .............................. 2002-161198

(51) Int. Cl.
*G01L 1/04* (2006.01)
(52) U.S. Cl. ................................. 73/862.621
(58) Field of Classification Search ........... 73/762–820
See application file for complete search history.

(56) References Cited

U.S. PATENT DOCUMENTS

| 4,319,650 | A | * | 3/1982 | Brendel .................... 177/156 |
| 4,818,036 | A | * | 4/1989 | Reinecke .................. 303/50 |
| 4,922,722 | A | * | 5/1990 | Kazumoto et al. ............... 62/6 |
| 5,090,249 | A | * | 2/1992 | Bielewicz ..................... 73/822 |
| 6,460,835 | B1 | * | 10/2002 | Hamano et al. .............. 267/34 |
| 6,588,542 | B1 | * | 7/2003 | Nakajima et al. ........... 181/102 |
| 6,880,639 | B1 | * | 4/2005 | Rhodes et al. .............. 166/321 |
| 2002/0056622 | A1 | | 5/2002 | Yamanashi et al. |
| 2005/0269871 | A1 | * | 12/2005 | Saito .......................... 303/20 |

FOREIGN PATENT DOCUMENTS

| EP | 0 602 606 | 6/1994 |
| JP | 59-29553 | 2/1984 |
| JP | 9-254778 | 9/1997 |
| JP | 2603578 | 1/2000 |
| JP | 2001-281074 | 10/2001 |

* cited by examiner

*Primary Examiner*—Max Noori
(74) *Attorney, Agent, or Firm*—Wenderoth, Lind & Ponack, L.L.P.

(57) ABSTRACT

A load sensor includes a load-input unit, an hourglass-shaped coil spring having one end coupled to the load input unit, a load-applying unit disposed at the other end of the hourglass-shaped coil spring, and a load detector for receiving the load from the load-applying unit and detecting the load. The load sensor does not give a user an uncomfortable pedal feeling, similarly to a hydraulic brake.

13 Claims, 6 Drawing Sheets

LOAD SENSOR HAVING HOURGLASS-SHAPED COIL SPRING

TECHNICAL FIELD

The present invention relates to a load sensor used in an electric braking device.

BACKGROUND ART

A conventional load sensor disclosed in Japanese Patent Laid-Open Publication No. 09-254778 will be described below.

FIG. 8 is a sectional view of the conventional load sensor. The conventional load sensor mounted in a car body 23 includes a first spring seat 18, a second spring seat 19, a conical spring 15, a cylindrical spring 16, a piezoelectric element 17, a pedal 21, and a brake arm 22. The conical spring 15 is located between the second spring seat 19 and the first spring seat 18 attached to the brake arm 22. When a driver starts to step on the pedal 21, a load is applied to the piezoelectric element 17 via the conical spring 15, and the piezoelectric element 17 converts the load to an electric signal corresponding to the load by its piezoelectric effect and detects the load. FIG. 9 shows a load characteristic of the sensor. In FIG. 9, the horizontal axis represents a stroke of the pedal, and the vertical axis represents the load. When the stroke is in a range L, the load and a reaction by the conical spring 15 are balanced. When the stroke exceeds the range L, the first spring seat 18 contacts the cylindrical spring 16, and then, the load and the sum of respective reactions by the conical spring 15 and the cylindrical spring 16 are balanced. The load characteristic of the load sensor has a fold point P, as shown in FIG. 9.

FIG. 7 is a load characteristic diagram of a hydraulic brake. The horizontal axis represents a stroke of a pedal, and the vertical axis represents a load. In the hydraulic brake, as shown in FIG. 7, the load rapidly increases when the stroke of the pedal exceeds a predetermined value.

The fold point P is not found in the load characteristic diagram of the hydraulic brake in FIG. 7. A rapid change of the load at the fold point P of the conventional load sensor provides an uncomfortable pedal feeling, while the hydraulic brake does not provide an uncomfortable pedal feeling.

SUMMARY OF THE INVENTION

A load sensor includes a load-input unit, an hourglass-shaped coil spring having an end coupled to the load-input unit, a load-applying unit provided at other end of the hourglass-shaped coil spring, and a load detector for receiving the load from the load-applying unit and detecting the load.

The load sensor does not give a user an uncomfortable pedal feeling, similarly to a hydraulic brake.

DETAILED DESCRIPTION OF PREFERRED EMBODIMENTS

Exemplary Embodiment 1

Figure 1A:
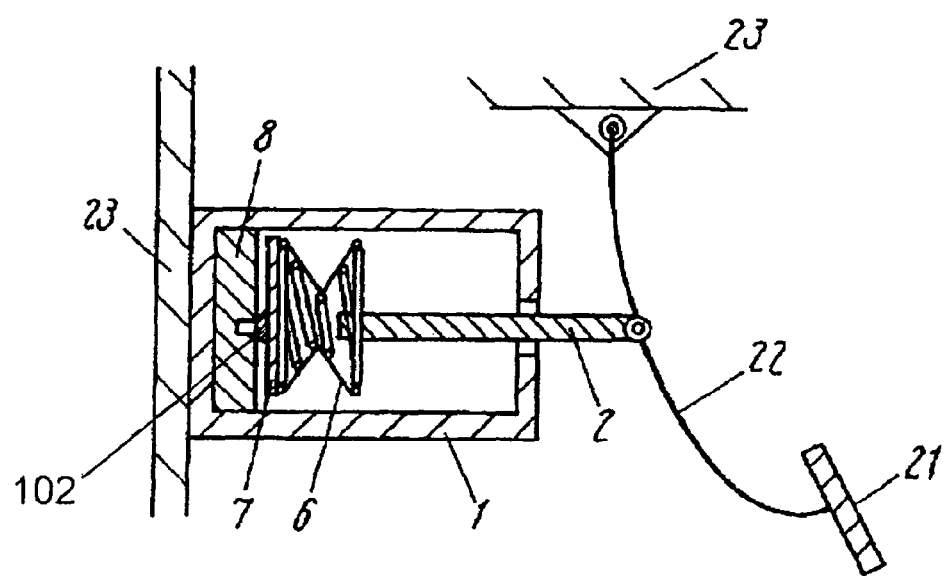
FIG. 1A is a sectional view of a load sensor in accordance with Exemplary Embodiment 1 of the present invention.
Figure 1B:
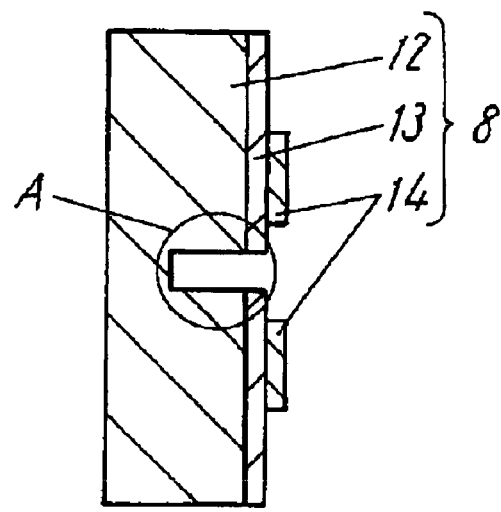
FIG. 1B and FIG. 1C are enlarged sectional views of essential parts of the load sensor in accordance with Embodiment 1.
Figure 1C:
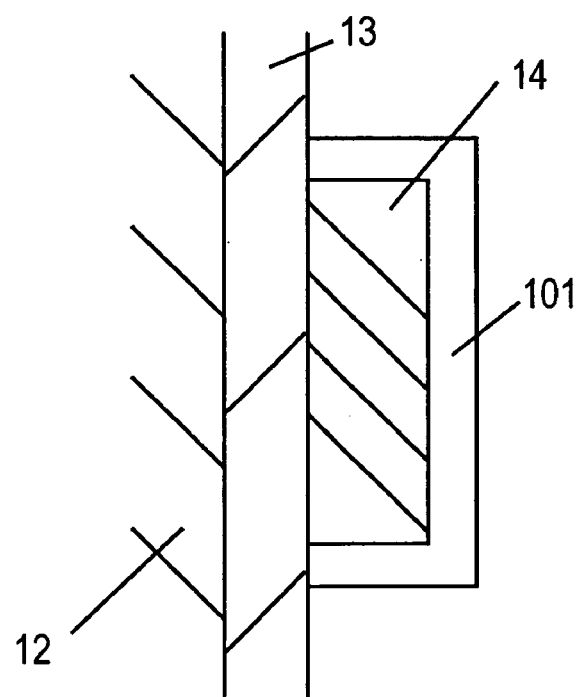
Figure 2:
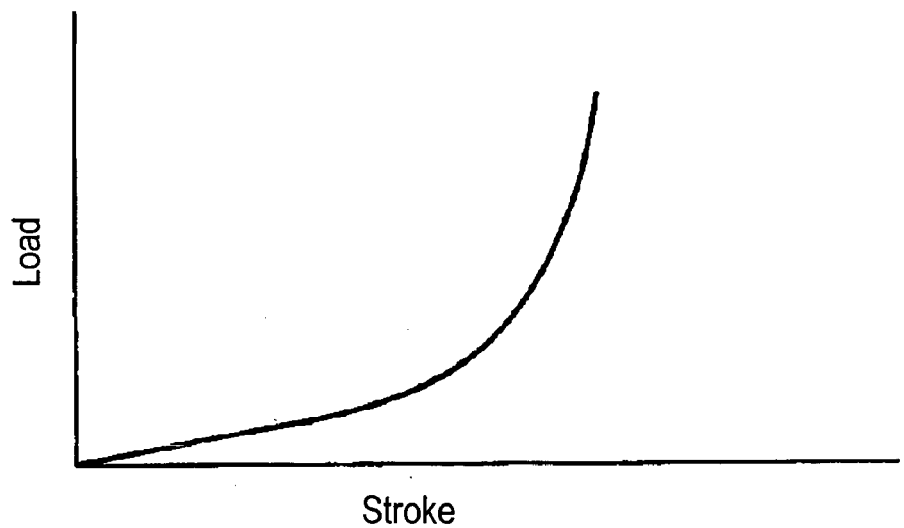
FIG. 2 is a load characteristic diagram of the load sensor in accordance with Embodiment 1.

FIG. 1A is a sectional view of a load sensor in accordance with Exemplary Embodiment 1 of the present invention. FIG. 1B and FIG. 1C are enlarged sectional views of a load detector of the load sensor. FIG. 2 is a load characteristic diagram of the load sensor in accordance with Embodiment 1.

At least one end of a load-input unit 2 projects out of a case 1. Another end of the load-input unit 2 is connected to one end of an hourglass-shaped coil spring 6, and the other end of the hourglass-shaped coil spring 6 is provided with a load-applying unit 7. A load detector 8 is disposed on an inner surface of the case 1, and faces the load-applying unit 7. One end of the load-input unit 2 is fixed to a brake arm 22. The brake arm 22 has one end fixed to a car body 23 and has other end provided with a pedal 21.

The load detector 8 will be described hereinafter. The load detector 8 includes a straining body 12 to be strained by a load applied thereto, an insulating layer 13 on the straining body 12, and a strain-resistance element 14 as a strain detector on the insulating layer 13 for detecting an amount of the strain in the straining body 12. The straining body 12 is made of elastic material, such as metal, that can be strained by a load applied thereto. The straining body 12 preferably has a shape strained easily by the applied load, and, for example, has a recess A, as shown in FIG. 1B.

The insulating layer 13 is made of glass ceramics, such as glass enamel, ceramic, mixture of glass and ceramic, or oxide of aluminum. The insulating layer 13 is mounted to the strain resistance element 14 without an adhesive or the like, thus having a high reliability of a contact with the element. As shown in FIG. 1C, a protective layer 101 may be provided at least on the strain resistance element 14 so as to protect the strain resistance element 14. The strain resistance element may employ not only the strain resistance element 14 but an element for outputting a signal of another electrophysical quantity in response to an amount of a strain applied thereto.

The load detector 8 faces the load-applying unit 7, and a surface of the load-applying unit 7 facing the load detector 8 has a projection 102. The projection 102 efficiently applies a load from the pedal 21 to the load detector 8. The projection 102 may have a semi-spherical surface to reduce variation of a point to apply the load to the load detector 8 even when the load-applying unit 7 tilts, hence increasing detection accuracy to the load of the load detector 8.

The recess A or a through-hole formed in the load detector 8 corresponding to the projection 102 reduces a variation of the action point of the load to the load detector 8, hence increasing the detection accuracy of the load. The opening of the recess A or the through-hole is preferably smaller than the projection area of the projection 102.

An operation of the load sensor will be described.

Figure 7:
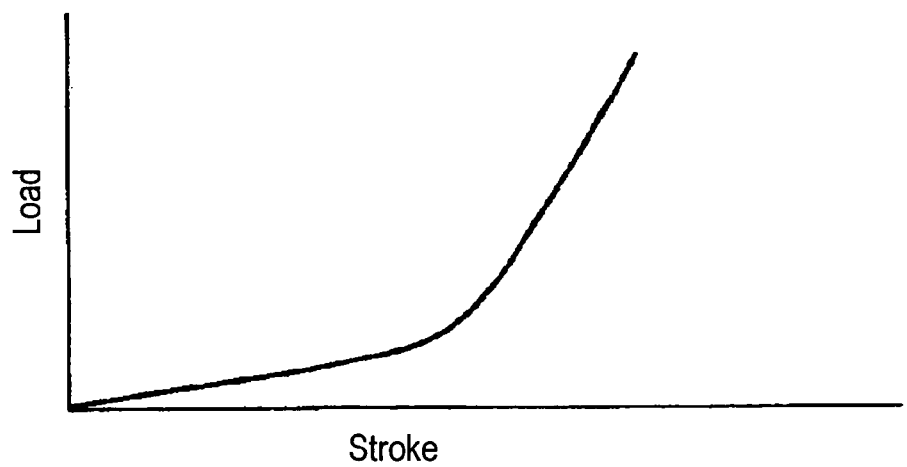
FIG. 7 is a load characteristic diagram of a hydraulic brake.
Figure 8:
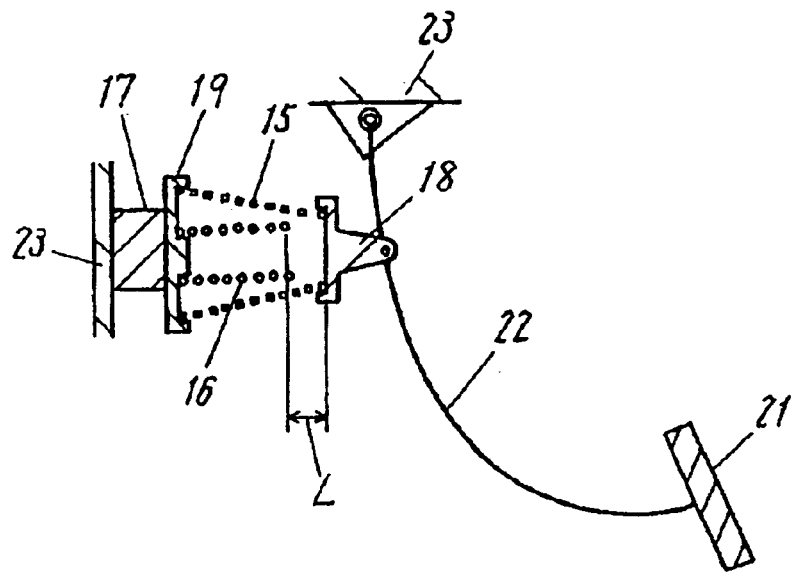
FIG. 8 is a sectional view of a conventional load sensor.
Figure 9:
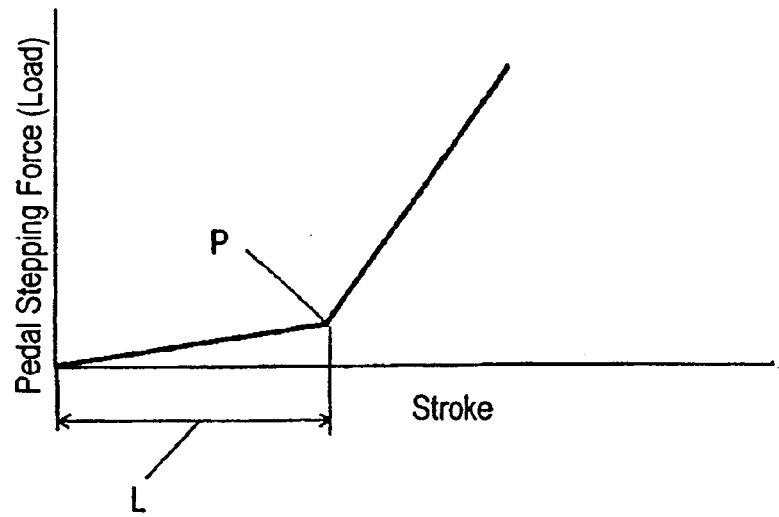
FIG. 9 is a load characteristic diagram of the conventional load sensor.

When a driver starts to step on the pedal 21, the load-input unit 2 moves together with the brake arm 22. Then, the load-applying unit 7 transmits the load to the load detector 8 via the hourglass-shaped coil spring 6, and the load produces a change of a strain resistance, and the change is converted to an electric signal. The load is balanced with a reaction of the hourglass-shaped coil spring 6, and hence, the load characteristic depends on the coil spring 6. The coil spring 6 has a nonlinear spring characteristic. In the nonlinear spring characteristic, the reaction of the coil spring 6 is small when an amount of a deformation of the spring is small, and rapidly increases when the amount of the deformation exceeds a predetermined value. FIG. 2 is the load characteristic diagram according to Embodiment 1. In FIG. 2, the horizontal axis represents a stroke of the pedal, and the vertical axis represents the load. The characteristic shown in FIG. 2 is substantially the same as the load characteristic of the hydraulic brake shown in FIG. 7, and has no fold point found therein to be smooth at a place where the load starts to increase more sharply.

The load characteristic shown in FIG. 2 can be adjusted by appropriately designing the hourglass-shaped coil spring 6, and a variation of the size of the coil spring 6 can be easily reduced by forming it with a die or the like. This reduces the variation of the load characteristic.

The diameter of the hourglass-shaped coil spring gradually decreases toward its center. Therefore, windings at both ends of the spring having a larger diameter are firstly displaced when the spring receives a load, and the coil spring has a smooth load curve. According to an increase of the load applied to the spring, an inner winding of the spring is then displaced, and a gradient of the load curve becomes sharp. Thus, in the hourglass-shaped coil spring, the load characteristic has no fold point found therein and has a smooth curve.

The hourglass-shaped coil spring has a structure including two conical springs connected to each other at their ends having smaller diameters. This coil spring has a sharper load characteristic curve on receiving a load than a single conical spring, and hence has a load characteristic similar to that of the hydraulic brake.

Additionally, the load sensor of Embodiment 1 has a single spring, hence allowing the sensor to have a cumulative error smaller than that of a sensor including plural springs and to produce a small variation of a pedal feeling.

Exemplary Embodiment 2

Figure 3:
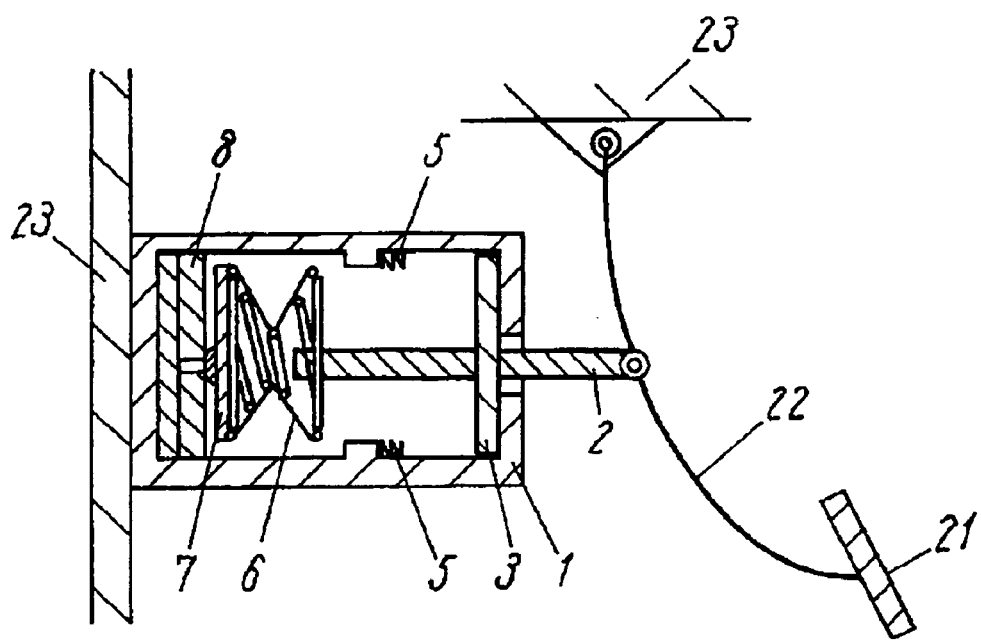
FIG. 3 is a sectional view of a load sensor in accordance with Exemplary Embodiment 2 of the invention.
Figure 4:
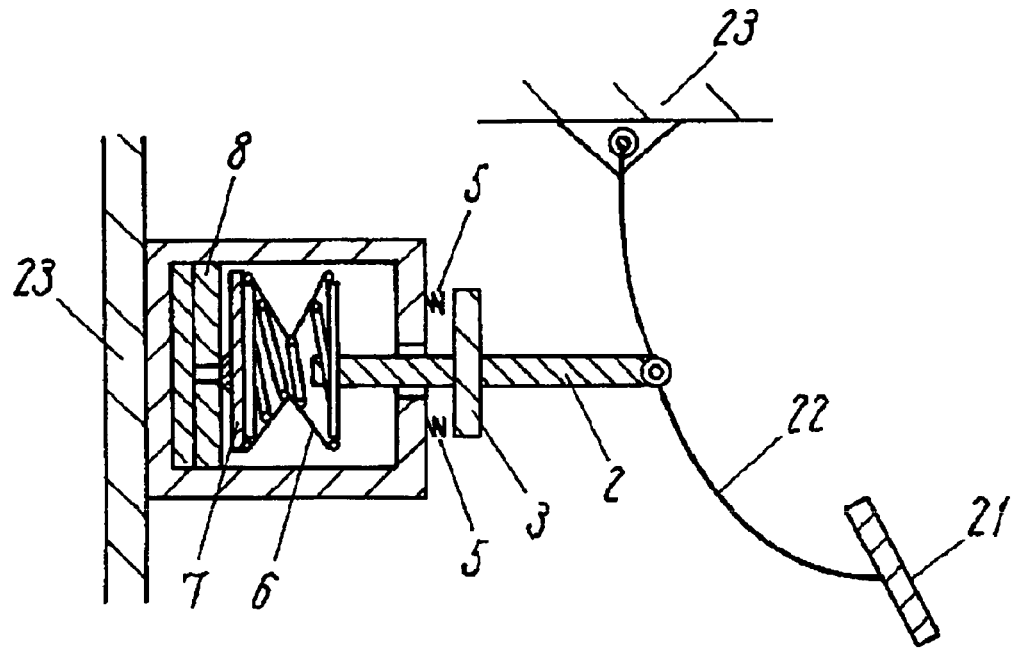
FIG. 4 is a sectional view of another load sensor in accordance with Embodiment 2.

FIGS. 3 and 4 are sectional views of load sensors in accordance with Exemplary Embodiment 2 of the present invention. The load sensors of Embodiment 2 include stopper 3 and impact buffers 5, differently from a sensor of Embodiment 1. When a load-input unit 2 having the stopper 3 is pressed into a case by a predetermined depth, namely, when a pedal 21 is stepped on by a predetermined amount, the stopper 3 contacts the impact buffers 5 provided in the case 1. The stopper 3 and the impact buffers 5 protect a load detector 8. The load sensor of Embodiment 2, being used for a brake, receives a rapid, large load, such as sudden braking. The stopper 3 and the impact buffers 5 prevent the load detector 8 from receiving such load exceeding the proof stress limit thereof.

The stopper 3 disposed on the load input unit 2 may be provided in the case 1, as shown in FIG. 3, or may be outside the case 1, as shown in FIG. 4. The impact buffers 5 are located on the case 1 at positions corresponding to the position of the stopper 3.

Elements other than discussed above in the load sensor of Embodiment 2 are the same as those of Embodiment 1, and are not described.

Exemplary Embodiment 3

Figure 5:
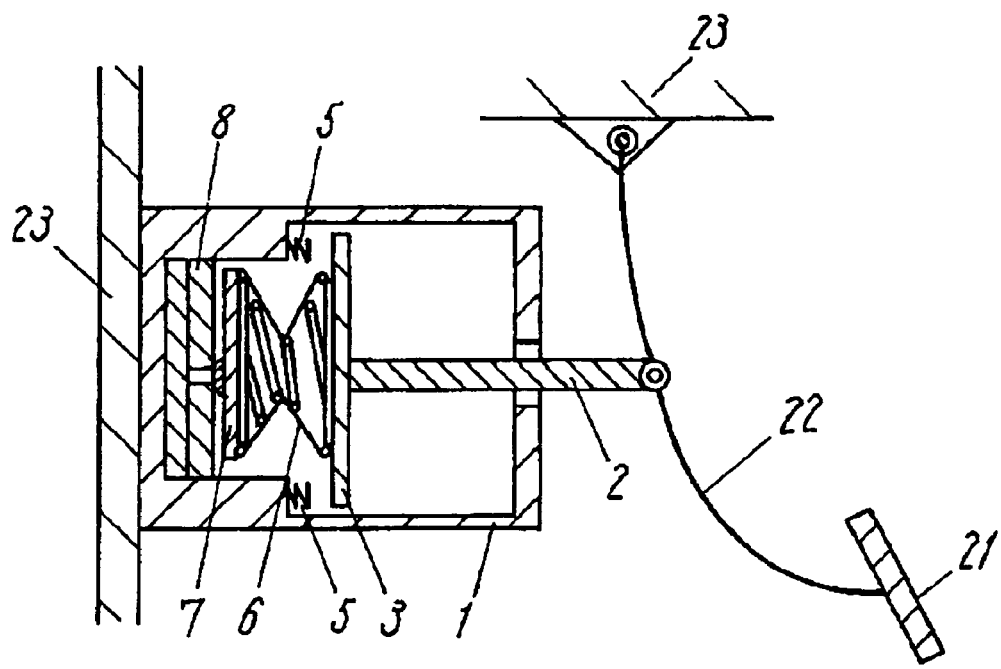
FIG. 5 is a sectional view of a load sensor in accordance with Exemplary Embodiment 3 of the invention.

FIG. 5 is a sectional view of a load sensor in accordance with Exemplary Embodiment 3 of the present invention. The load sensor of Embodiment 3 includes a stopper 3 between a load-input unit 2 and an hourglass-shaped coil spring 6, differently from a sensor of Embodiment 2 shown in FIG. 3. Impact buffers 5 provided in the case 1 contact the stopper 3 when the load-input unit 2 is pressed into the case 1 by a predetermined depth.

Elements other than discussed above in the load sensor of Embodiment 3 are the same as those of Embodiment 2, and are not described.

Exemplary Embodiment 4

Figure 6:
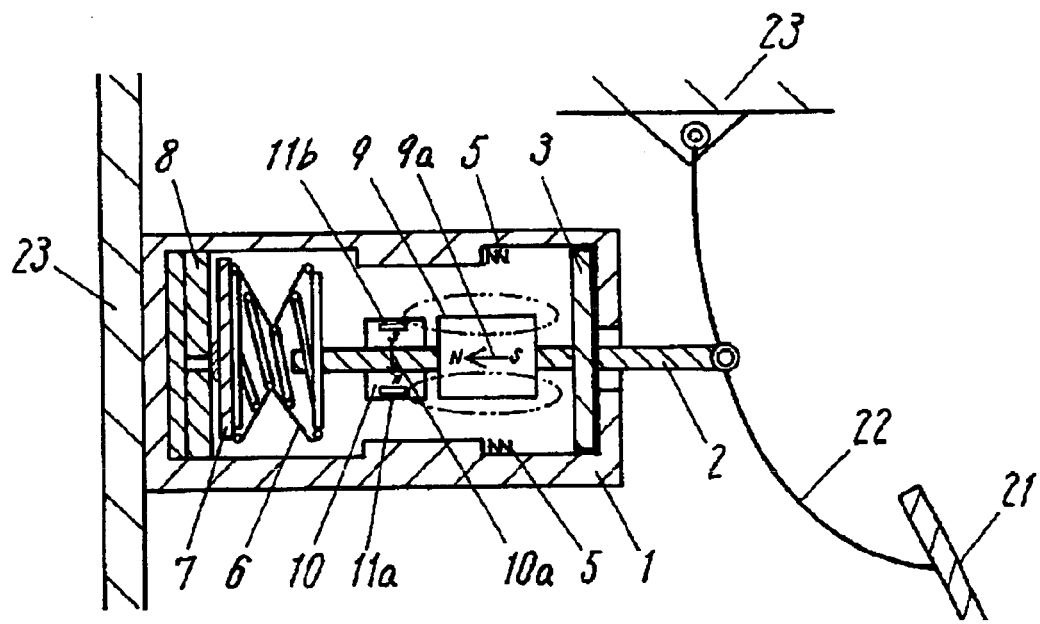
FIG. 6 is a sectional view of a load sensor in accordance with Exemplary Embodiment 4 of the invention.

FIG. 6 is a sectional view of a load sensor in accordance with Exemplary Embodiment 4 of the present invention. The load sensor of Embodiment 4 includes a stroke sensor, differently from sensors of Embodiments 1 to 3. In the load sensor shown in FIG. 6, the stroke sensor is provided in the load sensor of Embodiment 2 shown in FIG. 3.

A structure of the stroke sensor will be described hereinafter.

A first magnet 9 is fixed to a load-input unit 2, and a first magnetic pole vector 9a of the first magnet 9 is substantially parallel with a movable direction of the load-input unit 2. A second magnet 10 facing the first magnet 9 is fixed in a case 1 such that the position of the magnets is fixed with respect to a load detector 8 relatively. A second magnetic pole vector 10a of the second magnet 10 is substantially orthogonal to the first magnetic pole vector 9a. A first semiconductor magnetic resistance element 11a and a second semiconductor magnetic resistance element 11b are disposed on the second magnet 10. The resistance elements 11a and 11b have magnetism sensing directions substantially orthogonal to both the first magnetic pole vector 9a and the second magnetic pole vector 10a. The semiconductor magnetic resistance element 11a faces one end of a surface of the second magnet 10 facing the first magnet 9. The semiconductor magnetic resistance element 11b faces other end of the surface of the magnet 10 opposite to the one end with respect to the load-input unit 2.

An operation of the stroke sensor will be described hereinafter.

When a load is applied to move the load-input unit 2, the position of the first magnet 9 mounted to the load-input unit 2 changes. At this moment, the strength of a magnetic field applied to the semiconductor magnetic resistance elements 11a and 11b on the second magnet 10 facing the first magnet 9 varies. A change of the strength of the magnetic field changes resistances of the first semiconductor magnetic resistance element 11a and the second semiconductor magnetic resistance element 11b to generate an electric signal. This provides an output depending on the stroke of the pedal. The load sensor of Embodiment 4 has the load characteristic shown in FIG. 2, and a load corresponding to the stroke is determined based on the characteristic, thus allowing the stroke sensor to indirectly detect the load.

Therefore, the load sensor of Embodiment 6 detects a load directly with the load detector 8 and indirectly with the stroke sensor, hence having a fail-safe function.

This stroke sensor can detect an amount of the stroke in a non-contact manner, hence providing the load sensor with an improved reliability.

Elements other than discussed above in the load sensor of Embodiment 4 are the same as those of Embodiment 2, and are not described.

One of the stroke sensor and a combination of a stopper 3 and impact buffers 5 may be installed, or Both of them may be installed.

The stroke sensor may be disposed inside the case 1, as shown in FIG. 6 or may be disposed outside the case 1. One end of the load-input unit 2 projecting from an opening of the case 1 may be provided with the first magnet 9, and the outer surface of the case 1 may be provided with the second magnet 10 (not shown). This structure allows a positional relation between a first magnetic pole vector 9a and a second magnetic pole vector 10a to be similar to that in a sensor shown in FIG. 6. If a magnetic force in the stroke sensor is diffused by its iron component, or if the stroke sensor is exposed to disturbance, such as iron powder attached to a magnetic gap, the stroke sensor may be protected by a case.

The stroke sensor is installed in load sensors of Embodiments 2 and 4, but may be installed in load sensors of the other embodiments of the present invention.

The load detectors 8 of Embodiments 1 to 4 have an advantage of the hourglass-shaped coil spring not only in the structure discussed above but also in another structure.

INDUSTRIAL APPLICABILITY

A load sensor of the present invention has a load characteristic having no fold point and reduces an uncomfortable pedal feeling similarly to a hydraulic brake.

The invention claimed is:

1. A load sensor comprising:
   a load-input unit;
   an hourglass-shaped coil spring having a first end coupled to the load-input unit;
   a load-applying unit disposed at a second end of the hourglass-shaped coil spring; and
   a load detector for receiving a load from the load-applying unit and detecting an amount of the load wherein the load detector comprises a straining body arranged to be strained by the load, and a strain detector for outputting a signal corresponding to an amount of a strain in the straining body, wherein the load detector further comprises an insulating layer on the straining body, and wherein the strain detector is provided on the insulating layer.

2. The load sensor according to claim 1, further comprising
   a case having an opening and accommodating a portion of the load-input unit, the hourglass-shaped coil spring, the load-applying unit, and the load sensor,
   wherein a first end of the load-input unit projects out of the case through the opening.

3. The load sensor according to claim 1, wherein said hourglass-shaped coil spring has a characteristic load curve having no fold point.

4. The load sensor according to claim 1, wherein the load detector has a recess in a surface thereof facing the load-applying unit.

5. The load sensor according to claim 1, wherein the load-applying unit comprises a projection on a surface thereof facing the load detector.

6. The load sensor according to claim 5, wherein the projection has a spherical shape.

7. The load sensor according to claim 5, wherein the load detector has a recess in a surface thereof facing the load-applying unit.

8. The load sensor according to claim 7, wherein the recess of the load detector faces the projection of the load-applying unit.

9. The load sensor according to claim 1, further comprising a stroke sensor for detecting a moving stroke of the load-input unit.

10. The load sensor according to claim 9, wherein the stroke sensor comprises
    a first magnet provided at the load-input unit and having a first magnetic vector substantially parallel with a movable direction of the load-input unit,
    a second magnet located at a position fixed relatively to the load detector, the second magnet having a second magnetic vector substantially orthogonal to the first magnetic vector, and
    a magneto-electric transducer provided on the second magnet and having a magnet-sensing direction substantially orthogonal to both the first magnetic vector and the second magnetic vector.

11. The load sensor according to claim 2, further comprising:
    a stopper provided at the load input unit; and
    an impact buffer provided in the case and arranged to contact the stopper while the load-input unit moves toward the load sensor.

12. The load sensor according to claim 11, wherein the case accommodates the stopper, and the impact buffer is provided in the case.

13. The load sensor according to claim 2, further comprising:
    a stopper disposed at a second end of the load-input unit; and
    an impact buffer provided in the case and arranged to contact the stopper while the load-input unit moves toward the load sensor,
    wherein the first end of the hourglass-shaped coil spring is engaged with the stopper.

* * * * *

UNITED STATES PATENT AND TRADEMARK OFFICE
CERTIFICATE OF CORRECTION

PATENT NO. : 7,121,154 B2
APPLICATION NO. : 10/487563
DATED : October 17, 2006
INVENTOR(S) : Kiyoshi Saito et al.

It is certified that error appears in the above-identified patent and that said Letters Patent is hereby corrected as shown below:

ON THE TITLE PAGE

Under (56) References Cited, please add
--OTHER PUBLICATIONS
Edited by Japan Society for Spring Research, Bane, $3^{rd}$ edition, Maruzen Co., Ltd., December 20, 1982 (12/20/82), Pp. 224-229--.

IN THE CLAIMS

In column 5, line 43, please replace "load wherein" with --load; wherein--.

Signed and Sealed this

Third Day of April, 2007

JON W. DUDAS
*Director of the United States Patent and Trademark Office*